(12) United States Patent
Courchesne (10) Patent No.: US 11,669,846 B2
(45) Date of Patent: *Jun. 6, 2023

(54) METHOD FOR WEB-BASED DISTRIBUTION OF TARGETED ADVERTISING MESSAGES

(71) Applicant: Hugues Courchesne, Drummondville (CA)

(72) Inventor: Hugues Courchesne, Drummondville (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/396,362

(22) Filed: Aug. 6, 2021

(65) Prior Publication Data

US 2022/0036375 A1   Feb. 3, 2022

Related U.S. Application Data

(63) Continuation of application No. 16/579,185, filed on Sep. 23, 2019, now Pat. No. 11,087,335, which is a continuation of application No. 10/981,478, filed on Nov. 5, 2004, now Pat. No. 10,497,008.

(51) Int. Cl.
*G06Q 30/02* (2023.01)
*G06Q 30/0251* (2023.01)
*G06Q 30/0207* (2023.01)

(52) U.S. Cl.
CPC ......... *G06Q 30/02* (2013.01); *G06Q 30/0215* (2013.01); *G06Q 30/0224* (2013.01); *G06Q 30/0255* (2013.01); *G06Q 30/0258* (2013.01); *G06Q 30/0269* (2013.01)

(58) Field of Classification Search
CPC .............. G06Q 30/02; G06Q 30/0215; G06Q 30/0224; G06Q 30/0255; G06Q 30/0258; G06Q 30/0269
See application file for complete search history.

(56) References Cited

U.S. PATENT DOCUMENTS

| 5,794,210 A | * | 8/1998 | Goldhaber | ......... G06Q 30/0207 705/14.69 |
| 2002/0038350 A1 | * | 3/2002 | Lambert | ................ G06Q 30/02 707/E17.119 |

* cited by examiner

*Primary Examiner* — Breffni Baggot (57) ABSTRACT

A method for web browser-based distribution of targeted advertising messages is provided. An advertising party registers with a distributor of targeted advertising messages. An advertising campaign for goods targeting user demographic categories chosen by the advertising party is created, with advertising messages being customized for each category and the advertising messages being stored on a web server of the distributor. The advertising party pays the distributor for the advertising campaign. A user registers with the distributor for receiving advertising messages through a web browser and the user providing user demographic data and value account information at registration. The web browser home page of the user is configured with a user-specific URL corresponding to a set of targeted advertising messages according to the user demographic data. The user opens the browser and views the home page containing a target advertising message of the set of targeted advertising messages according to the user demographic category and the distributor credits the user value account upon the user viewing the advertising message.

2 Claims, 6 Drawing Sheets

METHOD FOR WEB-BASED DISTRIBUTION OF TARGETED ADVERTISING MESSAGES

CROSS-REFERENCE TO RELATED APPLICATION

This application claims priority to application Ser. No. 16/579,185 entitled Method For Web Based Distribution Of Targeted Advertising Messages, filed on Sep. 23, 2019, now U.S. Pat. No. 11,087,335, which is incorporated herein by reference.

FIELD OF THE INVENTION

The invention relates to distribution of targeted advertising messages. More specifically, it relates to a method allowing the distribution of customized advertising messages through a web-browser.

BACKGROUND OF THE INVENTION

Today's marketing communications landscape is changing as mass markets are fragmenting. Companies are developing more focused marketing programs in order to build stronger relationships with customers, as improvements in technology are helping marketers keep track of consumer needs. Since mass-marketing advertising methods are often inefficient due to a low level of customization, a new type of marketing, known as direct marketing is emerging as the most efficient way of building brand awareness and preference.

The Internet is increasingly used as an effective customer communication and relationship enhancer. Advertisers want to reach a large number of customers at the lowest cost/customer. An inexpensive means for delivering advertising content is through the use of banner advertising. Unfortunately, Internet mass-marketing efforts have been shown to have a relatively low impact since Internet users are becoming more experienced and developing what is known as "banner blindness".

Another Internet mass-marketing means is the use of bulk email. Unfortunately, traditional bulk email advertising is not directed to specific target markets. Additionally, customers have come to perceive receiving unsolicited email messages as intrusive and bothersome. With bulk email, the customers may access their email accounts on daily or weekly basis which reduces the advertising exposure time. The results of bulk email are that either the customer simply ignores the message or develops a negative opinion about the sender.

Studies show that marketing efforts are efficient when the customer has an interest in the product/service being marketed.

There exists therefore a need for a method of delivering advertising messages that offers repeated exposure, at a low cost/customer and provides customer value.

SUMMARY OF THE INVENTION

Accordingly, an object of the present invention is to provide a web-based distribution system and method for delivering targeted advertising messages.

According to a first broad aspect of the present invention, there is provided a method for web browser-based distribution of targeted advertising messages, comprising: an advertising party registering with a distributor of targeted advertising messages; creating an advertising campaign for goods targeting user demographic categories chosen by the advertising party, with advertising messages being customized for each the category, the advertising messages being stored on a web server of the distributor; the advertising party paying the distributor for the advertising campaign; a user registering with the distributor for receiving advertising messages through a web browser; the user providing user demographic data and value account information at registration; configuring the web browser home page with a user-specific URL corresponding to a set of targeted advertising messages according to the user demographic data of the user; the user opening the browser and viewing the home page containing a target advertising message of the set of targeted advertising messages according to the user demographic category; and the distributor crediting the value account upon viewing the advertising message.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
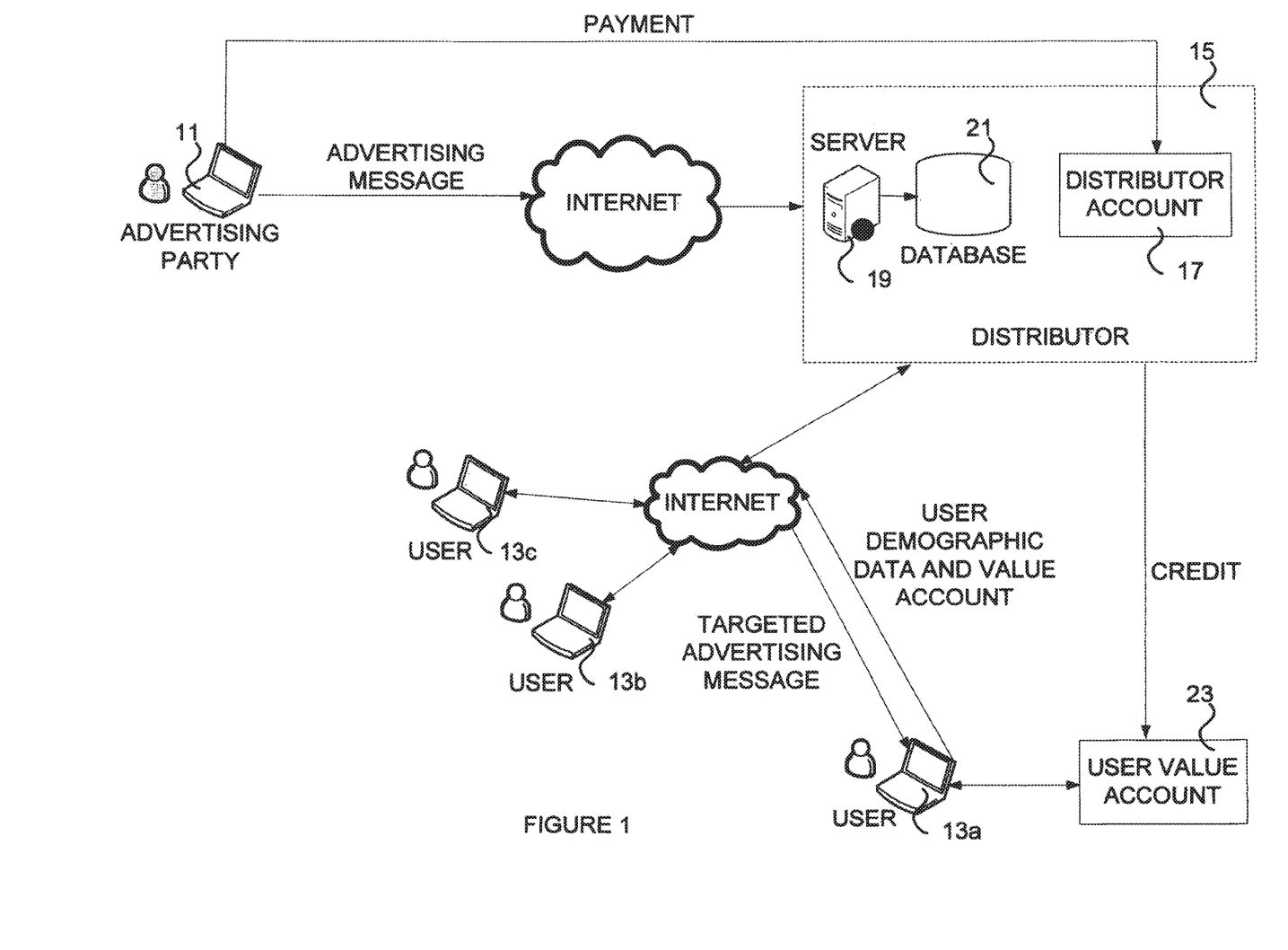
FIG. 1 is a block diagram of a web-browser based system for distribution of targeted advertising messages according to the preferred embodiment of the present invention.
Figure 4:
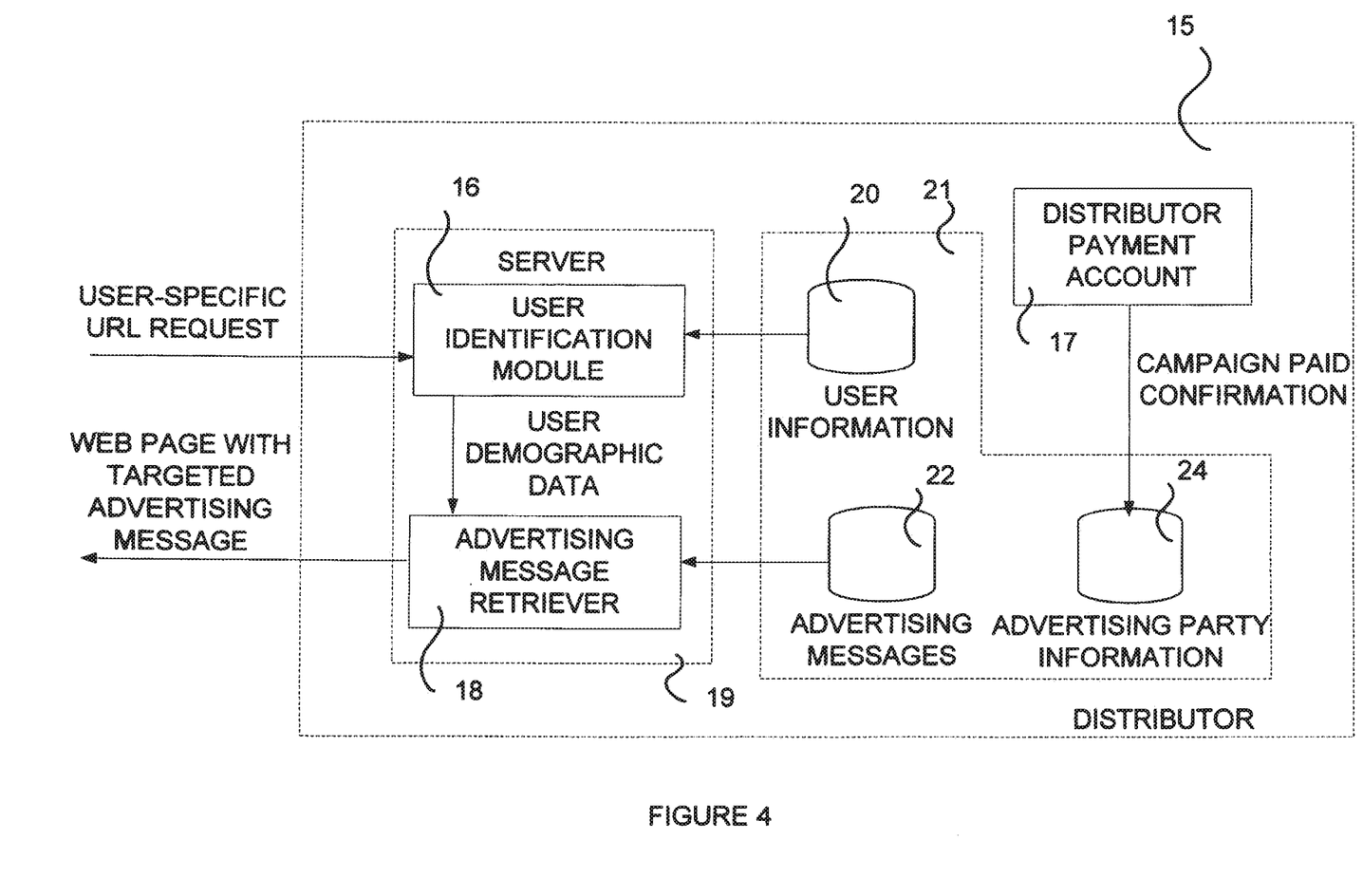
FIG. 4 is a block diagram of a distributor according to a preferred embodiment of the present invention.

Referring now to FIG. 1 and FIG. 4, there is shown a block diagram of a system for web browser-based distribution of targeted advertising messages. The system includes an advertising party 11 which creates and manages an advertising campaign for a product or a service. The advertising party 11 could be an advertising agency or a marketing department of a company. The advertising party 11 is responsible for creating an advertising message that will be distributed to the users of the targeted advertising system by means of the distributor 15. The advertising message contains information about a product, possibly including a promotional offer related to the product, such as a discount, a premium, an advertising specialty item gift, a patronage reward, a product sample, etc. or any other purchase incentive known in the art. The advertising message is preferably created by the advertising party 11 and the distributor 15, using customer demographic information stored by the distributor, for tailoring the advertising message to a target audience. The advertising party 11 selects the most appropriate target customers according to customer demographic data, develops an advertising message accordingly and the distributor stores it on the advertising messages database 22. Each advertising message can be accessed by an appropriate URL link. The distributor 15 stores additional information regarding the advertising campaign including: start date, end date, purchase confirmation, prizes awarded in conjunction with a search on the distributor search engine, etc. on the advertising party info database 24.

The advertising party 11 and the distributor 15 communicate with each other through a public network, such as the Internet. In this embodiment, for exemplary purposes, only one advertising party 11 is shown, although advertising parties 11 could communicate with a distributor 15 as part of the same system. The advertising party 11 communicates via any suitable transmission media, such as an ordinary public telephone line, a data quality line, a radio link or any other transmission media suitable for inter computer communication.

The distributor 15 includes a server 19 and a database 21, as well as a distributor account 17. The server 19 receives advertising messages content from advertising party 11 or requests for user-specific web pages from user stations 13 and ensures security of the transactions by implementing various security protocols.

Referring to FIG. 4, the server 19 uses the information stored on the user account information database 20, which includes account details for all of its registered users. The user account details may include user account ID, password, value account information, and demographic information such as age, gender, location, occupation, education, etc. The database 21 also comprises an advertising messages database 22 storing advertising messages of advertising campaigns and associated with advertising parties 11. The advertising party account information database 24 stores identification information and campaign details of advertising parties 11 with which the distributor has established contracts for distribution of advertising campaigns to registered users 13. The advertising party account information database 24 preferably includes information regarding the status of outstanding invoices for the distribution services. The distributor 15 further comprises a distributor payment account 17 for receiving payment from advertising parties for advertising campaign development and distribution services. Whenever the distributor payment account is credited by an advertising party 11 paying for an invoice, the database 24 receives a payment confirmation and the corresponding advertising party account is updated.

The server comprises a user identification module 16 which is in communication with the user account information database 20 for identifying a user given a URL request and retrieving the corresponding user demographic data. The user identification module 16 provides user demographic data to the advertising message retriever 18, which uses it to retrieve an appropriate advertising message from the advertising messages database 22.

In one embodiment of the present invention, the database 21 resides directly on the server 19. in the preferred embodiment of the present invention, the server 19 is a secure server protected by firewall and encryption technologies in order to ensure security of the information stored in the database 21. The distributor 15 uses a website as an interface to provide access to users 13 and advertising parties 11 to register with the advertising distribution system.

User 13 can be a member of an organization, a company, an educational institution such as a high school or university, or an individual user which registers with the distributor 15 for receiving targeted advertising messages and a credit value.

In a preferred embodiment, the user station 13 is a computer platform running, for example, a web-based application, and is in connection with a distributor 15. An exemplary computer system used at a user station 13 may comprise: a computer, an input system including a keyboard and a mouse, a display device, a digital camera, a document scanning device, a communication control device for communication with the network and possibly an external storage device. The computer includes a central processor unit (CPU), a read only memory (ROM), a random access memory (RAM) and an internal storage device. The software running at the user station 13 may reside on an external storage device or an internal one.

With respect to FIG. 2, a method for web browser-based distribution of targeted advertising messages will now be described. In a first step 31, an advertising party 11 registers with the distributor 15 of targeted advertising messages for the creation of an advertising campaign regarding a product or a service. The distributor 15 provides the advertising party 11 with user demographic categories and information so that a customized advertising campaign may be created, as per step 33. Users can be classified into demographic categories according to different demographic criteria, such as age, gender, geographical location, marital status, occupation, education, etc. A given demographic category can be very broad, such as all male students, or can be more focused, such as all male students between the ages of 18 and 24, living in urban areas, majoring in Engineering degrees. The distributor 15 preferably provides user purchasing habits statistical information regarding a particular user demographic category to better customize the advertising party's campaign. In a next step 35, the customized advertising message of the advertising campaign is stored on the advertising message database 22 of the distributor 15. The advertising message database stores a plurality of advertising messages corresponding to advertising campaigns contracted by advertising parties 11. The advertising messages are directly related to registered user profiles provided by the distributor 15.

The advertising party 11 then pays the distributor 15 for the advertising campaign and any other distribution fees, as per step 35. In the case in which the advertising party 11 is an advertising agency, the payment to the distributor could be a percentage of the total advertising fees charged to the client, typically 15%.

in a next step 39, a user 13 registers with the distributor 15 for receiving targeted advertising messages. In the preferred embodiment of the present invention, the user 13 registers with the distributor 15 by accessing the distributor website. A user at a user station 13 may register by using any commercially available internet web browser, such as Microsoft Internet Explorer™ or Netscape Navigator™. Any terminal with web-browsing abilities, such as a personal computer, a web-enhanced cellular phone or a personal digital assistant may be used. Upon requesting the Uniform Resource Locator (URL) address corresponding to the distributor website, a web page is loaded in the user's browser, requesting the user's identification credentials (typically a username and password). Access to the distributor website contents can be controlled using a variety of security mechanisms, including 128-bit SSL encryption. If the user is not yet registered with the distributor 15, a registration page will request that the user provide information such as username, password, value account details and demographic information, such as age, gender, location, marital status, interests, etc. Upon providing the required information, a user account is created and stored on the user account 20 database. At the time of registration, the user 13 is associated with an account ID. The user station receives a user-specific URL which includes the account ID. The user-specific URL is used to configure the web page launch settings of the web browser 51. In the preferred embodiment of the present invention, the web browser's home page is configured with the user-specific URL, such that, upon launching the web browser, a user-specific URL request is made.

In an alternative embodiment of the present invention, a customer could register while purchasing goods at a retail location. With respect to FIG. 3, in a first step 39a, the customer purchases products or services at a retail location and is informed by the retailer that a promotional offer or discount is available for the purchased goods. The retailer then verifies whether the customer is a registered user 13 of the advertising distribution network of the distributor 15. If the customer is already a user 13, then the retailer connects to the distributor website and provides the user's credentials such that the user's value account may be credited according to the promotional offer or discount The user's value account 23 may be a payment account, in which case the payment account is credited with a sum corresponding to the discount. The payment account could be identified by a credit card account number, a debit bank account number and associated code or a Paypal-type account Alternatively, the user's value account 23 could be a points-based reward account, in which case the value account 23 would be credited with a bonus number of points corresponding to the purchase.

Figure 3:
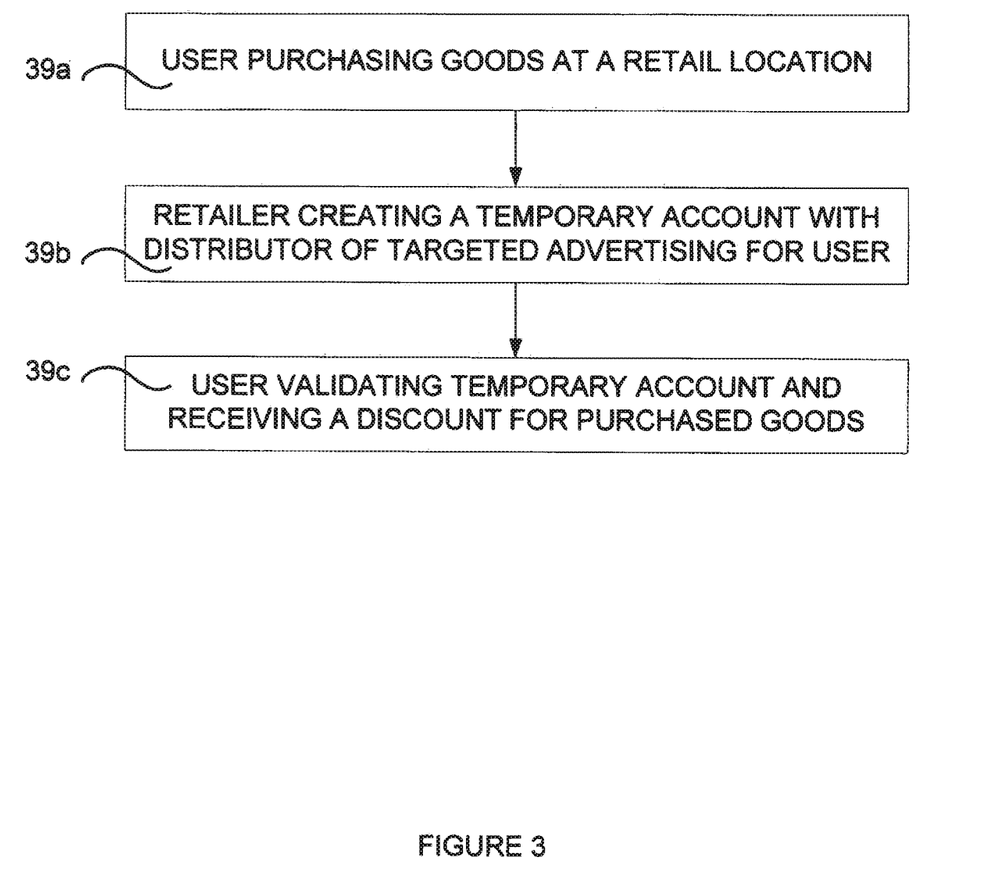
FIG. 3 is a flow chart of a method for a user registering with a distributor for receiving advertising messages according to one embodiment of the present invention.

If however the customer is not a registered user 13, the retailer connects to the distributor website in order to create a user temporary account as per step 39b. Following the purchase, the customer then connects to the distributor website in order to validate the temporary account. When customer validates the temporary account as per step 39c, the value account associated with the user account is credited for the amount of the promotional offer or discount.

Figure 5:
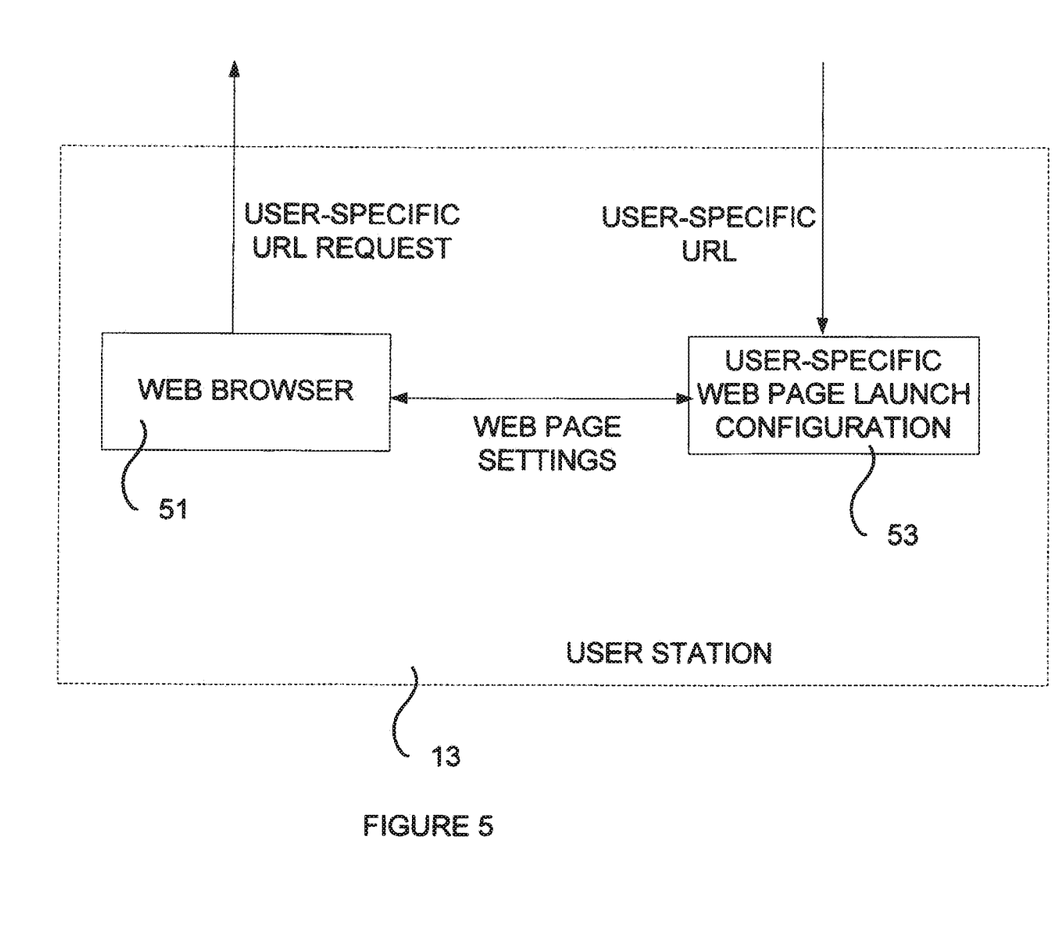
FIG. 5 is a block diagram of a user station according to a preferred embodiment of the present invention.

After registering with the distributor 15, the user provides user demographic data and value account information as per step 41. Next, in step 43, the user web browser home page is configured with a user-specific URL. In the preferred embodiment of the present invention, the user station 13 comprises a web browser 51 and a user-specific web page launch configuration module 53. The launch configuration module 53 receives, upon registration with the distributor 15, a user-specific URL corresponding to a user-specific web page to be launched at the user station 13. The launch configuration module is in communication with the web browser and can adjust the brows r home page settings to point to the user-specific URL, such that, upon launching the web browser, the user is directed to a user-specific web page. The user-specific web page contains the advertising message. The user specific web page could the user's home page or a web page opening in another window at the time that the web browser is launched.

With respect to FIGS. 4 and 5, the interaction between the user's browser and the distributor server 19 will now be described. When the user launches the web browser 51, the application sends a request for a user-specific URL. The server 19 receives the URL request and retrieves the account ID contained in the URL request The user identification module 16 of the server 19 then uses the account ID to retrieve user demographic data for the particular user. The user demographic data is sent to the advertising message retriever 18 module of the server 19, which accesses the advertising messages database 22 and retrieves an advertising message customized for the particular user profile. The server 19 then provides a web page containing the targeted advertising message to the user's web browser. In the case in which no advertising message stored on the advertising messages database 22 corresponds to the user profile, a default webpage, such as a distributor search engine website, is transmitted to the user 13.

Figure 2:
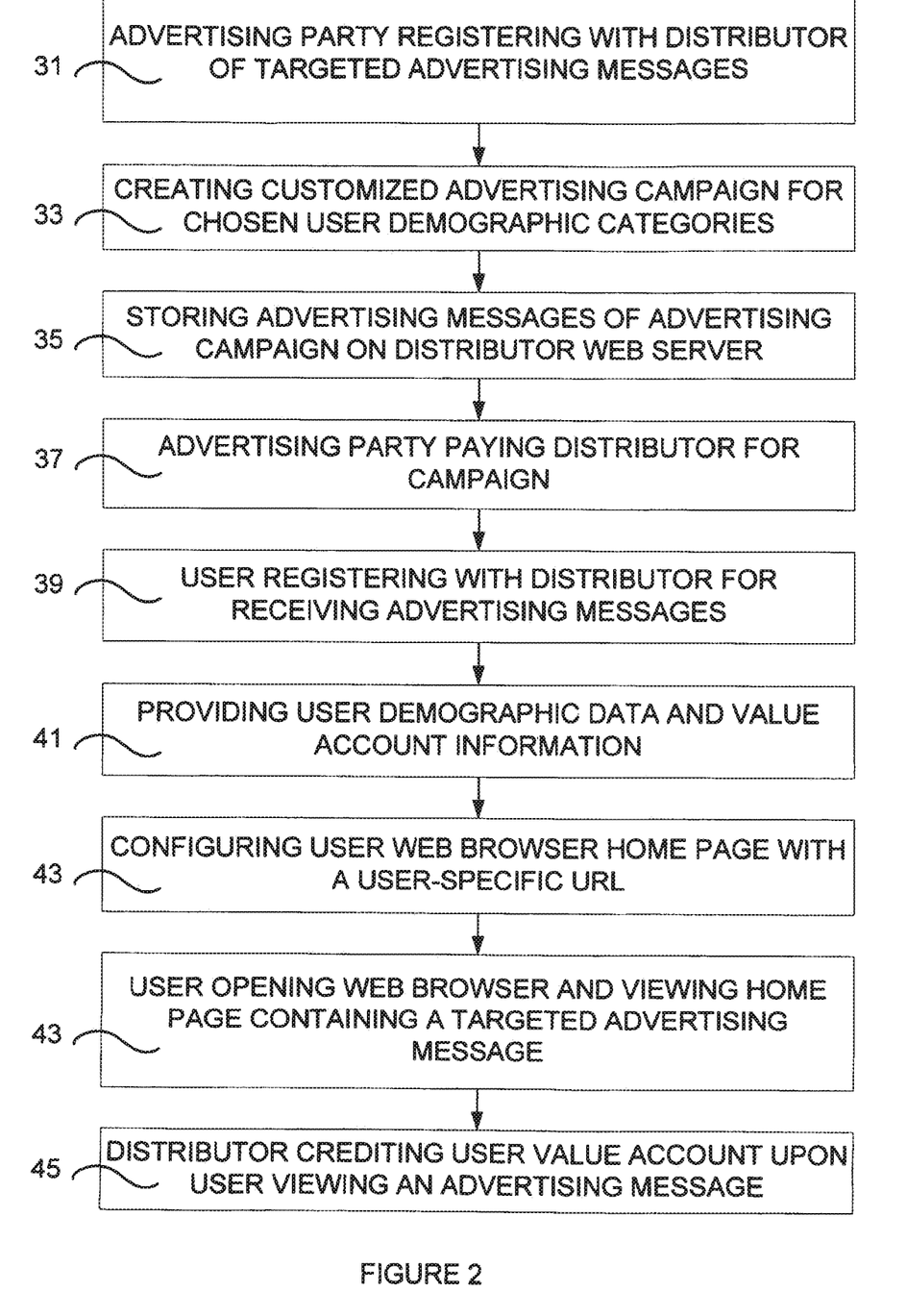
FIG. 2 is a flow chart of a method for web browser-based distribution of targeted advertising messages according to the preferred embodiment of the present invention.

Still with respect to FIG. 2, in step 43, the user 13 opens the web browser and views a web page containing a targeted advertising message. The advertising message displayed in the user's web browser corresponds to the user demographic data stored in the user account database 20. Upon the user viewing the advertising message, the distributor 15 credits the user value account 23.

In the preferred embodiment of the present invention, the user value account 23 is a payment account such as a Paypal account. A payment amount is transferred to the payment account of the user 13 each time an advertising message is viewed in the web browser 51. In the case in which the user is a individual user, the payment account is a personal account, while in the case in which the user belongs to an institution, such as an university, the payment account is an institutional account.

In another embodiment of the present invention, the users 13 of the targeted advertising distributor system 15 have the possibility of winning prizes following a web search using the distributor's web search engine. By connecting to the distributor website, a user 13 provides a search query by entering a description of a desired product or service in a search box of the distributor web search page. The search engine then provides the search results together with a prize, attributed on a random basis. In an alternative embodiment of the present invention, the search engine matches the product/services description provided as part of the search query with the products/services advertised by registered advertising parties 11 and randomly provides a prize to the user 13. The prize could include the goods searched or goods from other categories.

Figure 6:
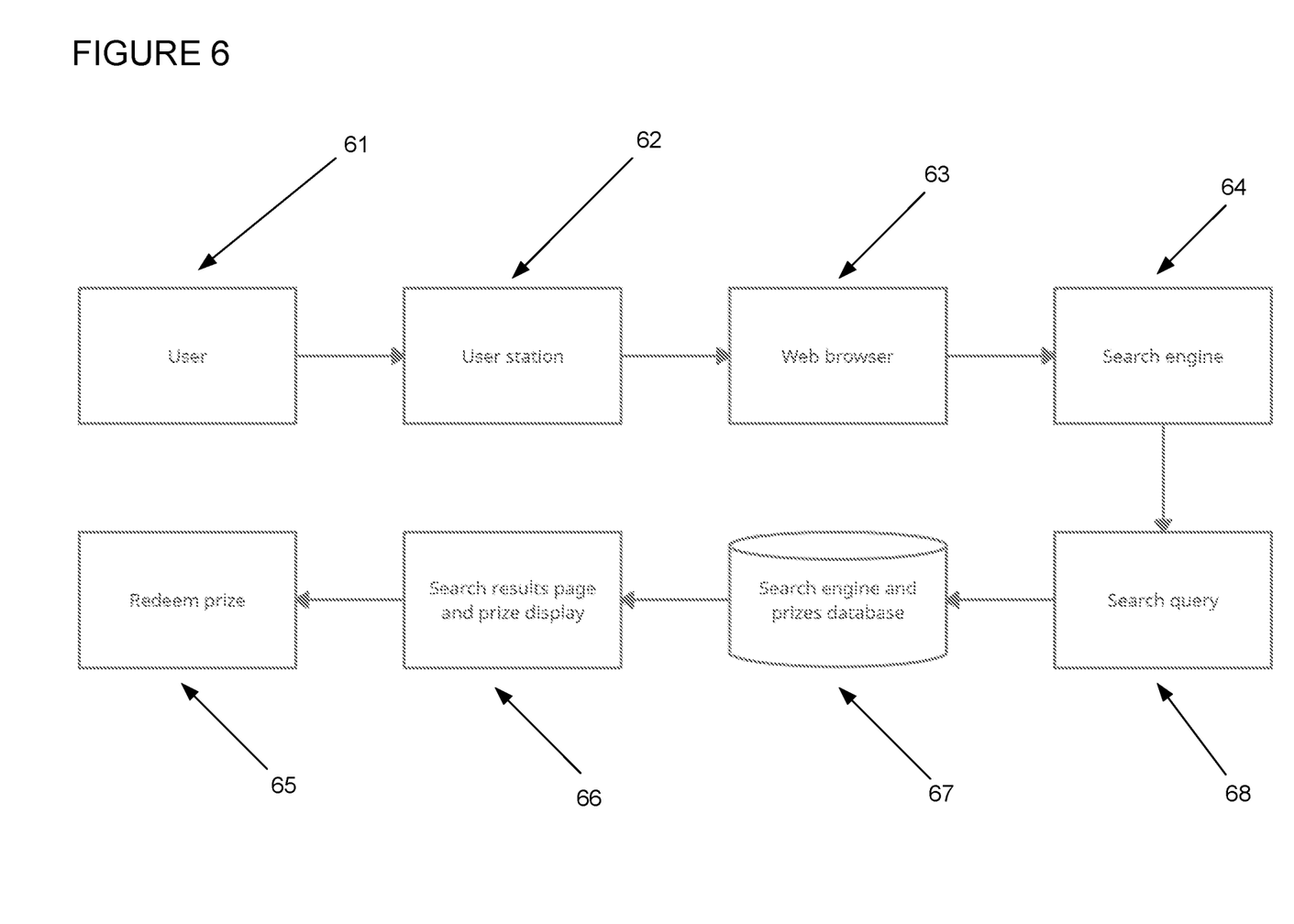
FIG. 6 is a block diagram of a further embodiment of the present invention.

FIG. 6 illustrates a further embodiment of the present invention showing a User 61, User station 62, Web browser 63, Search engine 64, Redeem prize 65, Search results page and prize display 66, Search engine and prizes database 67 and Search query 68.

It will be understood that numerous modifications thereto will appear to those skilled in the art. Accordingly, the above description and accompanying drawings should betaken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

I claim:

1. A method of application-based distribution of targeted advertising messages implemented by a electronic device including but not limited to a computer, a laptop, a smartphone, a tablet, a smart watch, a smart tv, a virtual reality headset, said electronic device including a CPU (Central Processing Unit), said application such as a web browser and any kind of application having a home page, said method comprising the steps of:
   128-bit SSL (Secure Sockets Layer) encrypting the targeted advertising messages stored on a web server of an application or a distributor for producing encrypted targeted advertising messages which contain at least one of information about a product, a promotional offer related to the product, a discount, a premium, gift, a patronage reward, a product sample, purchase incentive;

registering an advertising party in said application or distributor electronic database with said encrypted targeted advertising messages;

storing on the application or distributor web server protected by a firewall the encrypted targeted advertising messages;

registering a user within said application electronic database, producing a user registration which includes an account ID (Identifier) and at least one or more of username, password, value account detail, demographic information including one or more of age, gender, location, marital status, personal interest;

the user registering for receiving at least one of said encrypted targeted advertising messages through said application;

receiving, from said user profile, a value account related to said user profile at said user registration and receiving data related to said user profile, that data including at least user account ID, password, information related to said value account, and demographic information including one or more of age, gender, location, occupation, education, and;

said CPU, upon said application connecting to said web server, providing a home page for said application;

the user identification module at said web server communicating with said electronic database and identifying said user and providing to said application a home page including said account ID and corresponding to said encrypted targeted advertising messages according to said user, wherein said home page and a unique home page for each respective user which includes the account ID;

said application launch configuration module communicating with said application for a first launch of the application under the control of said CPU;

said application configuring the launch settings of the home page of said application to said user-specific URL;

upon a second subsequent launch of said application, said application launching to said user-specific URL, wherein said configured launch settings of said application persist after said application is closed;

closing the application for producing a closed application, said application launch settings persisting, and being the same, after closing as before to closing;

said web server, under the control of said CPU, returning said home page to said user in accordance with said user-specific URL address when said application is launched again;

said home page containing at least one of said targeted advertising messages and a search engine in accordance with said data from said user profile;

said value account being credited under the control of said CPU upon said application web server returning said home page to said user;

and said value account being credited under the control of said CPU upon said user performing a search query to said search engine page.

2. A method as claimed in claim 1, said user providing a search query containing goods description to said search engine;

said search engine returning search results based on matching said goods description with said advertised goods by said advertising party and;

said web browser displaying a prize of said advertised goods by said advertising party to said user;

the user redeem the prize display on said search result page.

* * * * *